United States Patent [19]

Huey

[11] Patent Number: 4,666,485

[45] Date of Patent: May 19, 1987

[54] METHOD AND APPARATUS FOR MAKING TAPERED MINERAL AND ORGANIC FIBERS

[75] Inventor: Larry J. Huey, Granville, Ohio

[73] Assignee: Owens-Corning Fiberglas Corporation, Toledo, Ohio

[21] Appl. No.: 814,573

[22] Filed: Dec. 26, 1985

Related U.S. Application Data

[63] Continuation-in-part of Ser. No. 677,665, Dec. 3, 1984, abandoned.

[51] Int. Cl.$^4$ .......................................... C03B 37/022
[52] U.S. Cl. ................................................ 65/2; 65/1; 65/12; 264/177.1; 425/76; 425/463; 428/197; 428/399
[58] Field of Search ............... 65/1, 2, 12; 264/177 F; 425/397, 399; 428/76, 463

[56] References Cited

U.S. PATENT DOCUMENTS

| | | | |
|---|---|---|---|
| 2,294,266 | 8/1942 | Barnard | 65/1 |
| 2,377,810 | 6/1945 | Robbins | 428/399 X |
| 2,453,864 | 11/1948 | Schlehr | 65/12 X |
| 2,465,283 | 3/1949 | Schlehr | 65/12 X |
| 2,578,986 | 12/1951 | Schoonenberg et al. | |
| 2,908,036 | 10/1959 | Russell | 65/12 |
| 3,063,094 | 11/1962 | Warthen | 65/2 X |
| 3,268,313 | 8/1966 | Burgman et al. | 65/2 X |
| 3,600,491 | 8/1971 | Shimada et al. | 264/177 F |
| 3,607,185 | 9/1971 | Andrysiak | 65/1 |
| 3,623,939 | 11/1971 | Ono et al. | 264/177 F |
| 3,650,716 | 3/1972 | Brossard | 65/6 |
| 3,775,074 | 11/1973 | Russell | 65/8 X |
| 3,912,478 | 10/1975 | Presby | 65/2 |
| 3,914,488 | 10/1975 | Gorrafa | 264/177 F X |
| 3,930,106 | 12/1975 | Mihara et al. | 428/399 |
| 4,001,369 | 1/1977 | Shah | 264/177 F X |
| 4,028,081 | 6/1977 | Marcatili | 65/2 |
| 4,038,062 | 7/1977 | Presby | 65/2 |
| 4,050,915 | 9/1977 | Brown | 65/1 |
| 4,091,065 | 5/1978 | Shah | 264/177 |
| 4,144,044 | 3/1979 | Russell | 65/2 |
| 4,291,096 | 9/1981 | Taylor | 428/399 X |
| 4,307,478 | 12/1981 | Ward et al. | 428/399 X |
| 4,316,924 | 2/1982 | Minemura et al. | 428/399 X |
| 4,329,163 | 5/1982 | Russell | 65/12 |
| 4,349,364 | 9/1982 | Morrison | 65/2 |
| 4,362,541 | 12/1982 | Thompson | 65/12 X |
| 4,376,746 | 3/1983 | Ward et al. | 264/177 F X |
| 4,385,916 | 5/1983 | Jochem et al. | 65/3.13 |
| 4,391,618 | 7/1983 | Lecron | 65/1 |
| 4,398,933 | 8/1983 | Lecron | 65/1 |
| 4,401,451 | 8/1983 | Lecron | 65/1 |
| 4,437,869 | 2/1984 | Lecron | 65/1 |
| 4,469,499 | 9/1984 | Lecron | 65/1 |

FOREIGN PATENT DOCUMENTS 835428  12/1938  France ................................. 65/12

*Primary Examiner*—Robert Lindsay
*Attorney, Agent, or Firm*—Ronald C. Hudgens; Kenneth H. Wetmore; Ted C. Gillespie

[57] ABSTRACT

A tapered fiber and method and apparatus for making is provided in which the fiber has an increasing cross-sectional dimension in one direction along a portion of its length, and a decreasing cross-sectional dimension in the same direction along the same portion of its length.

12 Claims, 7 Drawing Figures

METHOD AND APPARATUS FOR MAKING TAPERED MINERAL AND ORGANIC FIBERS

This is a continuation-in-part of U.S. patent application Ser. No. 677,665, filed Dec. 3, 1984, now abandoned.

TECHNICAL FIELD

This invention pertains to fibers of heat-softenable material and the manufacture of such fibers for such uses as textiles, reinforcements, construction materials, and insulating materials. With respect to this invention, fibers of heat-softenable material means mineral fibers and organic, synthetic fibers which are thermoplastic, such as polymeric material, e.g., nylons and polyesters. With respect to this invention, mineral fibers means fibers of glass, rock, slag or basalt. In one of its more specific aspects, this invention pertains to non-circular mineral fibers and, in particular, non-circular glass fibers.

BACKGROUND OF THE INVENTION

The production of wool glass fibers by means of the rotary process is well known. In general, molten glass is fed into a spinner which revolves at high speeds. The spinner has a peripheral wall containing a multiplicity of orifices. Molten glass passed by centrifugal force through the orifices of the peripheral wall forms small diameter molten glass streams. Positioned circumferentially about the spinner is an annular blower for turning the fibers downwardly and, in some cases, for further or secondary attenuation of the original or primary fibers to produce fibers of smaller diameter. As the streams of molten glass are emitted from the orifices, they are still sufficiently nonviscous that surface tension forces pull or shape each of the molten streams into substantially circular cross-sections, regardless of the cross-sectional shape of the streams as they are emitted from the orifices. Further, rotary fiberizers are typically equipped with annular burners or other sources of hot gases for secondary attenuation of the primary fibers; these hot gases keep the glass sufficiently fluid or nonviscous that fibers of substantially circular cross-section result.

The production of textile or continuous glass fibers by mechanically drawing molten streams of glass from orifices in the bottom wall of a bushing or feeder is also well known. Non-uniformities in the roundness of the molten streams tend to be corrected by surface tension forces prior to the cooling and hardening of the molten streams into glass fibers. Thus, as in the case of wool glass fiber production, it has not been possible to produce significantly non-circular continuous fibers using shaped orifices in a bushing.

There has long been a need for producing fibers, both in the rotary process and in the continuous fiber process, that have significantly non-circular cross-sections. With respect to reinforcement of resin matrices, such non-circular fibers would be useful in imparting greatly increased transverse strength and improved shear strength qualities. Non-circular fibers for use as insulation materials would be advantageous in that the increased surface area per unit volume of glass would lower the thermal conductivity of insulation made from such fibers.

A measure of the non-circularity of mineral fibers is the "mod ratio", which is defined as the ratio of the diameter D of the smallest circle into which the fiber cross-section fits to the diameter d of the largest circle which can fit inside the fiber cross-section. As employed herein, fibers having a mod ratio of less than 1.2 are referred to as circular fibers; fibers having a mod ratio greater than or equal to 1.2 are referred to as non-circular fibers.

One attempt to make non-circular glass fibers was by Warthen, as described in U.S. Pat. No. 3,063,094. Warthen's method employs mechanical perturbation of the glass stream while it is still in a plastic, deformable state. Warthen teaches that to create a non-circular fiber, the glass stream, initially in a conical shape with a circular cross-section, should be distorted at a region where the viscosity of the stream is sufficiently high as to become rapidly chilled or solidified during attenuation of the streams to a continuous fiber whereby a similar distortion in the cross-sectional configuration is retained in the attenuated solidified fiber. Warthen also teaches that a heat sink is to be applied to the glass stream by direct contact. This raises the viscosity of the molten glass to better enable retention and perpetuation of the non-circular cross-sectional character of the mechanically perturbed molten glass stream.

Other attempts at producing non-circular fibers have been shown in the art. Processes are known for modifying round glass fibers in order to produce optical fiber wave guides of a non-circular shape. In some cases, a double crucible method is employed for making an optical fiber in which the inner fiber core has a non-circular cross-section. It is also known in the art of making glass fibers to use a mechanical stirrer positioned within the fiber forming cone to produce a twisted or distorted fiber.

In the art of producing organic fibers, it is a common practice to use quenching methods to solidify molten streams of organic material into non-circular cross-sections which are similar to the shapes of the non-circular orifices. However, these methods are practical under conditions which differ greatly from conditions associate with forming mineral fibers. The production of organic non-circular fibers can be facilitated by pressurization of the bushings, whereas pressurization of bushings containing molten glass presents severe operating problems. The melting points of glass and organic compositions differ by 1500° F. (815° C.) or more. The viscosity of molten glass is about 300 poises whereas the viscosity of the molten organic material is on the order of about 1000 to about 3000 poises. Also, the surface tension forces of glass (on the order of about 250 to about 300 dynes/cm) are an order of magnitude greater than those of the synthetic material (about 30 dynes/cm). The lower viscosity and higher surface tension of glass make it about 100 times more difficult to prevent the shaped glass fibers from re-forming into glass fibers having circular cross-sections.

Another long-felt need in the art of manufacturing heat-softenable, thermoplastic fibers is that of producing fibers which will mechanically bond to the resin matrix which is to be reinforced. For example glass fibers having nodules or spikes would exhibit a mechanical bonding which would prevent or significantly reduce the tendency of fibers to slip or fail upon the application of mechanical forces, such as tension. Such odd-shaped fibers are difficult to make on a commercially acceptable basis. The current practice in the manufacture of fibers for reinforcements is to coat the reinforcement with a size or coupling agent to provide a chemical bond between the fiber and the resin matrix.

Another solution proposed to the problem of mechanical bonding of fibers to resin matrices is the production of tapered fibers. A tapered fiber embedded in a resin matrix will exhibit partial mechanical bonding in that the fiber will be unable to slip in the direction of the small end of the tapered fiber, but will be able to slip in the direction of the large end of the fiber. To overcome the undirectional nature of tapered fibers, it would be possible to cyclically vary the diameter of the fiber, hereby creating alternating regions of positive and negative taper. Then, as long as the length of the chopped fiber is greater than about one-half the wave length of the cycle, the fiber length will have some taper in both directions, hereby assuring mechanical bonding in both directions.

With some commonly used chopped fiber lengths (about $1\frac{1}{4}$ to about $\frac{1}{8}$ in. or 3.18 to 0.318 cm), and at commonly used fiber production speeds (about 1000 to 10,000 ft/min, or 5.08 to 50.8 m/sec), production of chopped fiber having a taper in both directions would require cycles of very high frequency, and short wave lengths. The frequency required would be on the order of hundreds or thousands of hertz, which would be impractical, especially considering the requirement that the angle of taper have sufficient slope to ensure mechanical bonding with the resin matrix. Thus, even cyclically varying tapered fibers are not a complete solution to the problem of mechanical bonding fibers to resin matrices.

In spite of past attempts to manufacture non-circular mineral fibers, there has never been a commercially successful method or apparatus for achieving the goal of making non-circular fibers from non-circular orifices. Also, there is a need for more easily produced mineral and organic fibers capable of exhibiting a mechanical bonding mechanism.

STATEMENT OF THE INVENTION

It has now been found that heat-softenable, thermoplastic material can be made into fibers, such as glass fibers, and these thermoplastic fibers can be produced with tapered surfaces being tapered in each direction of the fiber over each portion of the fiber. This can be accomplished by producing thermoplastic fibers having non-circular cross-sections and by changing the shape of the cross-sections during the production of the fiber to provide a simultaneous increasing and decreasing taper going in each direction of the fiber. The resulting fiber will have a cross-sectional dimension which is increasing in one direction and another cross-sectional dimension which is decreasing in the same direction along the same portion of the length of the fiber.

According to this invention, there is provided a heat-softenable fiber having an increasing cross-sectional dimension in one direction along a portion of its length, a a decreasing cross-sectional dimension in the same direction along the same portion of its length. The fiber of this invention can be chopped for introduction into a resin matrix.

In a specific embodiment of the invention, the thermoplastic fiber is a mineral fiber.

According to this invention, there is also provided a resin matrix reinforced with fibers according to the invention.

According to this invention, there is also provided a method of making heat-softenable fibers comprising discharging molten material from non-circular orifices to produce molten streams of non-circular cross-section, cooling the streams to harden them into fibers having a non-circular cross-sectional shape similar to the shape of the orifices, and varying the intensity of the cooling to increase one cross-sectional dimension of the streams while simultaneously decreasing another cross-sectional dimension of the streams prior to hardening the streams into fibers.

In a specific embodiment of the invention, the cooling step comprises directing quenching air from one or more nozzles into contact with the streams, and in which the varying step comprises varying the air flow supplied to the nozzles.

In another specific embodiment of the invention, the non-circular orifices are positioned in a bushing wall which is part of a feeder for containing molten material.

According to this invention, there is also provided apparatus for making non-circular heat-softenable fibers comprising a container for holding molten heat-softenable material, a plurality of non-circular orifices positioned in a wall of the container for discharging molten streams of non-circular cross-section, means for cooling the streams to harden them into fibers having a non-circular cross-sectional shape similar to the shape of the orifices, and means for varying the intensity of the cooling to increase one cross-sectional dimension of the streams while simultaneously decreasing another cross-sectional dimension of the streams prior to hardening the streams into fibers.

In a specific embodiment of the invention, the means for cooling comprises one or more nozzles positioned to direct cooling air into contact with the streams, and the means for varying the intensity of the cooling comprises means for varying the air flow supplied to the nozzles.

DESCRIPTION OF THE INVENTION

Figures 1, 2, 3, 4, 5, 6, 7:
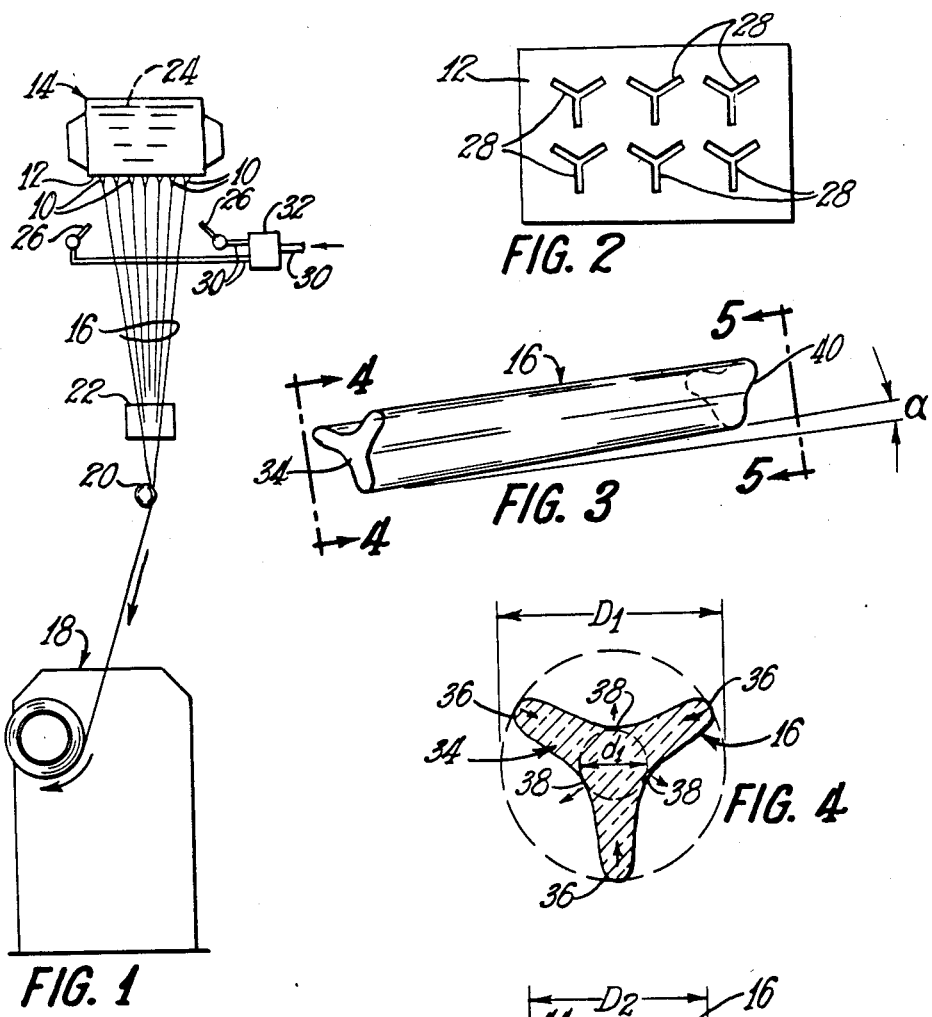
FIG. 1 is a schematic cross-sectional view in elevation of apparatus for forming glass fibers from a textile bushing according to the principles of the invention.
FIG. 2 is a schematic plan view of trilobal orifices according to the principles of the invention.
FIG. 3 is a schematic view in perspective of a portion of a mineral fiber according to the principles of the invention.
FIG. 4 is a view in elevation along line 4—4 of the end of the fiber shown in FIG. 3.
FIG. 5 is a view in elevation along line 5—5 of the end of the fiber shown in FIG. 3.
FIG. 6 schematically illustrates a resin matrix reinforced with the fibers of the invention.
FIG. 7 is a graph of fiber characteristics as a function of distance from the bushing bottom wall.

This invention will be described in terms of a glass fiber forming process and apparatus, and products made therefrom, although it is to be understood that the process is suitable for fibers of other heat-softenable, thermoplastic materials, particularly of such mineral materials as rock, slag and basalt, or of synthetic materials, such as polymeric materials, like nylon or polyester.

As shown in FIG. 1, molten glass streams 10 are emitted from orificed bushing bottom wall 12 of feeder or bushing 14. The molten streams are drawn into fibers 16 by the mechanical action of winder 18, although any suitable means for drawing the fibers can be employed. Gathering shoe 20 and size applicator 22 can be employed in the manner well-known in the art although fibers of the invention are suitable for use in resin matrices in the absence of a size coating. The bushing contains a body of molten glass 24 from which the streams of molten glass are drawn. As illustrated, air nozzles 26, which are means for quenching the streams of molten glass, are positioned to direct air into contact with the molten streams as they are emitted from the bushing bottom wall. The air flow cools the molten streams quickly enough into glass fibers so that they retain the general non-circular shape of the molten streams. Other suitable cooling fluids such as carbon dixoide, nitrogen, steam or water, can be employed to forceably cool the streams.

As shown in FIG. 2, the bushing bottom wall contains trilobal orifices 28 having the lobes positioned evenly around the periphery. The orifices and the resulting fibers can be of various shapes, such as, for example, cross-shaped, star-shaped, pentilobal, octalobal or rectangular. Although the embodiment of the invention illustrated utilizes a feeder having non-circular orifices in the bushing bottom wall, it is to be understood that the invention can be carried out in a rotary process by modulating the cooling effect on non-circular molten glass streams emanating from the spinner.

As shown in FIG. 1, the nozzles are supplied with air from a source, not shown, via air supply line 30. Positioned in the air supply line is pulse generator 32, which can be a rotary valve. The pulse generator causes a fluctuation or varying of the air flow supplied to the nozzles. The flow variation causes the quenching effect of the air from the nozzles to vary, rising and falling. The pulses can be periodic or random. As the quenching effect from the nozzles varies, the non-circular molten streams will vary in shape, thereby producing a fiber which is cyclically tapered.

In order to quantitatively describe the formation of non-circular glass fibers, it is useful to consider a time constant $\tau$ the decay of the shape from non-circular cross-section back to circular cross-section. As soon as a molten glass stream of non-circular cross-section flows from a non-circular orifice, surface tension forces act on the stream to change it into a circular cross-section. Opposing these forces are viscous forces, which tend to resist changes in the shape of the stream. The viscous forces increase extremely rapidly because of cooling as the molten glass in the stream moves away from the wall containing the orifices. In order to successfully make non-circular fibers, the viscous forces (i.e., the viscosity) must be increased quickly enough to retard the effect of the surface tension forces.

The time constant is believed to be the function of the viscosity of the glass, the equivalent radius of the glass stream, and the surface tension, according to the equation: $\tau = \mu r/\sigma$. This equation can be transformed with a velocity factor to enable integration over distance along the fiber, i.e., the distance away from the spinner peripheral wall, instead of with respect to time. In operation, when only a few time constants pass prior to the hardening or greatly increased viscosity of the glass, the fiber still maintains its non-circular shape. When many time constants pass, however, prior to reaching high viscosity, the glass stream returns to a circular cross-section and produces a circular fiber. When the inverse of the time constant is integrated over the distance to 100% attenuation, the ratio of the time-to-become-viscous to the time-to-revert-to-a-circular-cross-section is obtained. This ratio, difficult to measure exactly, can be estimated by the ratio Z, as given by the following equation:

$$Z = (x_{75}\sigma_o/\mu_o r_{eo}) * (1/v_o) * (1/v_o) * 1/(MR_o - 1)$$

where:
$x_{75}$ is the distance from the spinner peripheral wall at 75 percent attenuation (cm);
$\mu_o$ is the initial viscosity (poise);
$r_{eo}$ is the initial equivalent fiber radius (cm);
$\sigma_o$ is the initial surface tension of the mineral material (dynes/cm);
$v_o$ is the initial velocity (cm/sec) through the orifices; and
$MR_o$ is the initial mod ratio of said streams.

The factor $1/(MR_o - 1)$ is a factor indicative of the mod ratio of the hole, and hence the initial mod ratio of the glass stream. It has been found that this equation correlates very well with theoretical considerations as shown in FIG. 7 where the curve represents the reciprocal of the time constant as a function of distance from the orifice. The integral is the area underneath the curve, and the smaller the area underneath the curve, the smaller the number of time constants experienced by the stream before hardening and therefore the greater the mod ratio. It has been found that in order for the final fiber to be non-circular, Z should be less than or equal to 2, and preferably less than or equal to 1.

The inertia forces or glass pressure at the orifices can affect the extent to which non-circular fibers can be formed. The pressure can be produced by any means such as the hydrostatic head of the molten glass in a bushing, or the centripetal force in a spinner. For the production of glass fibers from the rotary process the pressure is preferably within a range of from about 0.5 psi (3480 Pascals) to about 250 psi (1,720,000 Pascals). In a bushing, the pressure at the orifices will preferably be within the range of from about 0.4 psig (2,800 Pascals) to about 100 psig (690,000 Pascals).

As shown in FIGS. 3, 4 and 5 the resulting fiber is a fiber having a taper going in both directions. The high-quench end 34 of the fiber includes lobes 36 and valleys 38. As can be seen, the cross-sectional shape of the fiber at either end is similar to the shape of the trilobal orifices.

During the formation of the fiber shown in FIG. 3, the quench rate decreased, thereby enabling the surface tension forces to reshape the cross-sectional shape shown at low quench end 40 of the fiber. The low quench end of the fiber has lobes 42 and valleys 44. The angle of taper from the high quench end to the low quench end of the fiber is shown as angle alpha. Although the low quench end of the fiber is closer to a round fiber than the high quench end o the fiber, the low quench end of the fiber still is similar to the shape of the trilobal orifices.

As shown in FIG. 4, the high quench end of the fiber can be characterized by outer diameter $D_1$, which is the smallest circle into which the entire cross-section can be placed. The high quench end of the fiber can also be characterized by $d_1$, which is the largest circle that can be positioned within the fiber cross-section. When the quench effect from the air nozzles is decreasing, the surface tension forces will pull the mineral fiber to change the shape of its cross-section in the manner illustrated by the arrows shown in FIG. 4. Accordingly, the lobes will be pulled in toward the center and the valleys will be pushed outward toward the outer diameter.

The resulting fiber has a cross-section as shown in FIG. 5, in which the corresponding outer diameter dimension, $D_2$, is smaller than $D_1$. Also, the corresponding inner diameter dimension, $d_2$, is greater than $d_1$. Thus, the portion of the fiber shown in FIG. 3 has an increasing cross-sectional dimension in one direction along a portion of its length: the inner diameter $d_2$ is increased over the inner diameter $d_1$. Also, the portion of the mineral fiber has a decreasing cross-sectional dimension in the same direction along the same portion of its length: the outer diameter $D_2$ is smaller than the outer diameter $D_1$.

The measure of the extent or degree of simultaneous increasing and decreasing taper of the mineral fibers of this invention can be obtained by considering the changing mod ratio of the fiber. The cyclical nature of the quenching in the method of the invention results in a cyclically varying mod ratio over a fairly wide range, referred to as the mod ratio range. When the average mod ratio ($MR_a$) is considered, a new parameter, the modulation number, can be defined, as follows:

modulation number = mod ratio range/2($MR_a$−1)

The modulation number is a measure of the relative change of mod ratios. In order to gain the greatest benefit from the invention, the modulation number will be greater than about 0.03. Preferably, the modulation number is within the range of from about 0.03 to about 2.0, and most preferably, within the range of from about 0.1 to about 1.0.

Although the means for varying the intensity of the cooling has been illustrated as a pulse generator for modifying the flow supplied to the air nozzles, it is to be understood that other means for varying the intensity of the cooling can be employed. Means could be used to vary the temperature, volume, or direction of the cooling fluid coming from the nozzles. For example, an external modulator or flow interrupter, such as a propeller, can be used to vary the cooling. Modulation of heat or cooling from other sources such as induction coils or fin shields could also be employed.

As shown in FIG. 6, the fibers of this invention can be chopped and used to reinforce resin matrix 46 to provide a reinforced product. The mineral fibers of this invention can be used to reinforce any organic or inorganic matrix suitable for use with other types of reinforcement. For example, thermoplastic or thermoset resins, such as polyesters or epoxys, could be used.

EXAMPLE I

Continuous E glass trilobal fibers were made from a tipless bushing having a single trilobal orifice under the following conditions:
Trilobal Orifice size:
　depth: 0.015 in. (0.38 mm)
　width of each leg: 0.010 in. (0.25 mm)
　length of each leg to center of orifice: 0.030 in. (0.76 mm).
Glass temperature = 2267° F. (1242° C.).
Glass type: 200E.
Glass flow rate: 0.033 lb/hr/hole (0.25 g/min/hole).
Number of filaments: 1.
Quench medium: air at 80° F. (27° C.).
Quench nozzle size: 0.125 in (3.18 mm) diameter tube.
Quench nozzle position: 1 in (25 mm) from orifice at a 15 degree angle from horizontal.
Maximum quench flow rate: 25 scfh (0.85 kg/hr).
Quench modulator: rotary in-line valve.
Quench frequency: 8.3 hz.
Winder speed: 300 ft/min (1.52 m/s).
Applied wave number (quench frequency/winder speed): 0.139 in$^{-1}$ (0.0546 cm$^{-1}$).
Measured wave number on fiber: 0.115–0.135 in$^{-1}$ (0.0453–0.0532 cm$^{-1}$).
Wavelength: 8.0 in (20.3 cm).
Ave. fiber dia.: 147 HT (37.3 microns).
　Fiber dia. range over a cycle: 98–188 HT (24.9–47.0 microns)—based on cross-sectional area.
Ave. mod ratio ($MR_a$): 1.46.
　Mod ratio range over a cycle: 1.17–1.83.
Modulation number [mod ratio range/(2($MR_a$−1))]: 0.72.

EXAMPLE II

Continuous E glass trilobal fibers were made from a tipless bushing having a single trilobal orifice under the following conditions:
Trilobal Orifice size:
　depth: 0.015 in. (0.38 mm)
　width of each leg: 0.010 in. (0.25 mm)
　length of each leg to center of orifice: 0.030 in. (0.76 mm).
Glass temperature = 2295° F. (1258° C.).
Glass type: 200E.
Glass flow rate: 0.042 lb/hr/hole (0.32 g/min/hole).
Number of filaments: 1.
Quench medium: air at 80° F. (27° C.).
Quench nozzle size: 0.125 in (3.18 mm) diameter tube.
Quench nozzle position: 1.5 in (38 mm) from orifice at a 15 degree angle from horizontal.
Average quench flow rate: 45 scfh (1.53 kg/hr).
Quench modulator: rotary vane (propeller).
Quench frequency: 51 Hertz.
Winder speed 2140 ft/min (10.9 m/sec).
Applied wave number (quench frequency/winder speed): 0.119 in$^{-1}$ (0.0469 cm$^{-1}$).
Measured wave number on fiber: 0.117 in$^{-1}$ (0.0461 cm$^{-1}$).
Wavelength: 8.53 in (21.7 cm).
Ave. fiber dia.: 64 HT (16.2 microns)
　Fiber dia. range over a cycle: 53–76 HT (13.4–19.3 microns)—based on cross-sectional area.
Ave. mod ratio ($MR_a$): 1.15
　Mod ratio range over a cycle: 1.0–1.3.
Modulation number [mod ratio range/(2($MR_a$−1))]: 1.0.

EXAMPLE III

Continuous E glass trilobal fibers were made from a tipless bushing having a single trilobal orifice under the following conditions:
Trilobal Orifice size:
　depth: 0.015 in. (0.38 mm).
　width of each leg: 0.010 in. (0.25 mm).
　length of each leg to center of orifice: 0.030 in. (0.76 mm).
Glass temperature = 2295° F. (1258° C.).
Glass type: 200E.
Glass flow rate: 0.042 lb/hr/hole (0.32 g/min/hole).
Number of filaments: 1.
Quench medium: air at 80° F. (27° C.).
Quench nozzle size: 0.125 in (3.18 mm) diameter tube.
Quench nozzle position: 1.5 in (38 mm) from orifice at a 15 degree angle from horizontal.

Average quench flow rate: 65 scfh (2.21 kg/hr).
Quench modulator: rotary vane (propeller).
Quench frequency: 51 hz.
Winder speed: 2140 ft/min (10.9 m/s).
Applied wave number (quench frequency/winder speed): 0.119 in$^{-1}$ (0.0469 cm$^{-1}$).
Measured wave number on fiber: 0.125 in$^{-1}$ (0.0492 cm$^{-1}$).
Wavelength: 8.0 in (20.3 cm).
Ave. fiber dia.: 56.3 ft (14.3 microns).
Fiber dia. range over a cycle: 41.4–67.0 HT (10.5–17.0 microns)—based on cross-sectional area.
Ave. mod ratio (MR$_a$): 1.51
   Mod ratio range over a cycle: 1.43–1.60.
Modulation number [mod ratio range/(2(MR$_a$−1))]: 0.167.

It will be evident from the foregoing that various modifications can be made to this invention. Such, however, are considered as being within the scope of the invention.

INDUSTRIAL APPLICABILITY

This invention will be found to be useful in the production of heat-softenable, thermoplastic fibers for such uses as reinforcements for resin matrices.

I claim:

1. A method for making mineral fibers of heat-softenable mineral material comprising discharging molten mineral material from non-circular orifices to produce molten streams of non-circular cross-section, cooling said streams to harden them into mineral fibers having a non-circular cross-sectional shape similar to the shape of said orifices, and varying the intensity of said cooling to increase on cross-sectional dimension of said streams while simultaneously decreasing another cross-sectional dimension of said streams prior to hardening said streams into mineral fibers.

2. The method of claim 1 in which said cooling step comprises directing quenching air from one or more nozzles into contact with said streams, and in which said varying step comprises varying the air flow supplied to said nozzles.

3. A method for making mineral fibers from heat-softenable mineral material comprising discharging molten mineral material from non-circular orifices positioned in a bushing wall to produce molten streams of non-circular cross-section, said bushing wall being positioned in a feeder containing molten mineral material, directing cooling fluid into contact with said streams to harden them into mineral fibers having a non-circular cross-sectional shape similar to the shape of said orifices before said streams can assume a circular cross-section, and varying the intensity of said fluid to increase one cross-sectional dimension of said streams while simultaneously decreasing another cross-section dimension of said streams prior to hardening said streams into mineral fibers.

4. Apparatus for making non-circular mineral fibers from heat-softenable mineral material comprising a container for holding molten mineral material, a plurality of non-circular orifices positioned in a wall of said container for discharging molten streams of non-circular cross-section, means for cooling said streams to harden them into mineral fibers having a non-circular cross-sectional shape similar to the shape of said orifices, and means for varying the intensity of said cooling to increase one cross-sectional dimension of said streams while simultaneously decreasing another cross-sectional dimension of said streams prior to hardening said streams into mineral fibers.

5. The apparatus of claim 4 in which said means for cooling comprises one or more nozzles positioned to direct cooling air into contact with said streams, and said means for varying the intensity of said cooling comprises means for varying the air pressure supplied to said nozzles.

6. The apparatus of claim 5 in which said container comprises a feeder, and said wall comprises a bushing bottom wall.

7. A method for making organic fibers of heat-softenable material comprising discharging molten material from non-circular orifices to produce molten streams of non-circular cross-section, cooling said streams to harden them into fibers having a non-circular cross-sectional shape similar to the shape of said orifices, and varying the intensity of said cooling to increase one cross-sectional dimension of said streams while simultaneously decreasing another cross-sectional dimension of said streams prior to hardening said streams into fibers.

8. The method of claim 7 in which said cooling step comprises directing quenching air from one or more nozzles into contact with said streams, and in which said varying step comprising varying the air flow supplied to said nozzles.

9. A method for making organic fibers of heat-softenable material comprising discharging molten material from non-circular orifices positioned in a bushing wall to produce molten streams of non-circular cross-section, said bushing wall being positioned in a feeder containing molten material, directing cooling fluid into contact with said streams to harden them into fibers having a non-circular cross-sectional shape similar to the shape of said orifices before said streams can assume a circular cross-section, and varying the intensity of said fluid to increase one cross-sectional dimension of said streams while simultaneously decreasing another cross-section dimension of said streams prior to hardening said streams into fibers.

10. Apparatus for making non-circular organic fibers of heat-softenable material comprising a container for holding molten material, a plurality of non-circular orifices positioned in a wall of said container for discharging molten streams of non-circular cross-section, means for cooling said streams to harden them into fibers having a non-circular cross-sectional shape similar to the shape of said orifices, and means for varying the intensity of said cooling to increase one cross-sectional dimension of said streams while simultaneously decreasing another cross-sectional dimension of said streams prior to hardening said streams into fibers.

11. The apparatus of claim 9 in which said means for cooling comprises one or more nozzles positioned to direct cooling air into contact with said streams, and said means for varying the intensity of said cooling comprises means for varying the air pressure supplied to said nozzles.

12. The apparatus of claim 11 in which said container comprises a feeder, and said wall comprises a bushing bottom wall.

* * * * *